Jan. 5, 1926.

L. FEY

BERMUDA GRASS CUTTER

Filed Jan. 26, 1925

1,568,549

Inventor;
Louis Fey,
per Arthur J. Farnsworth,
Attorney.

Patented Jan. 5, 1926.

1,568,549

UNITED STATES PATENT OFFICE.

LOUIS FEY, OF LONG BEACH, CALIFORNIA.

BERMUDA-GRASS CUTTER.

Application filed January 26, 1925. Serial No. 4,821.

*To all whom it may concern:*

Be it known that I, LOUIS FEY, a citizen of the United States, residing at Long Beach, in the county of Los Angeles and State of California, have invented a new and useful Bermuda-Grass Cutter, of which a specification is set forth below.

In this specification, and the accompanying drawing, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to implements for removing Bermuda grass and the like from lawns. Among its more important objects are; first, to provide a tool adapted for cutting horizontally growing stems, as well as vertical stems; second, to furnish an implement of this class that is largely self-clearing and not likely to become clogged up in use; third, to afford facilities in such a device for most conveniently freeing it from accumulations when they do occur; and, fourth, to accomplish the above objects by means of an extremely simple and relatively inexpensive construction.

My objects are attained in the manner illustrated in the accompanying drawing, in which—

Similar reference numerals refer to similar parts throughout the several views.

Such plants as Bermuda grass grow with their stems spread out over the surface of the ground. These horizontal stems cannot be cut by means of a lawn mower and, unless they are severed, they greatly interfere with the use of implements intended for operation by drawing over the surface of the lawn. Thus a tool in the form of a rake, and provided with side cutting blades, might successfully cut the vertical stalks of Bermuda grass if it were not for the matted growth of horizontal stalks that interfere with its operation.

Figure 1:
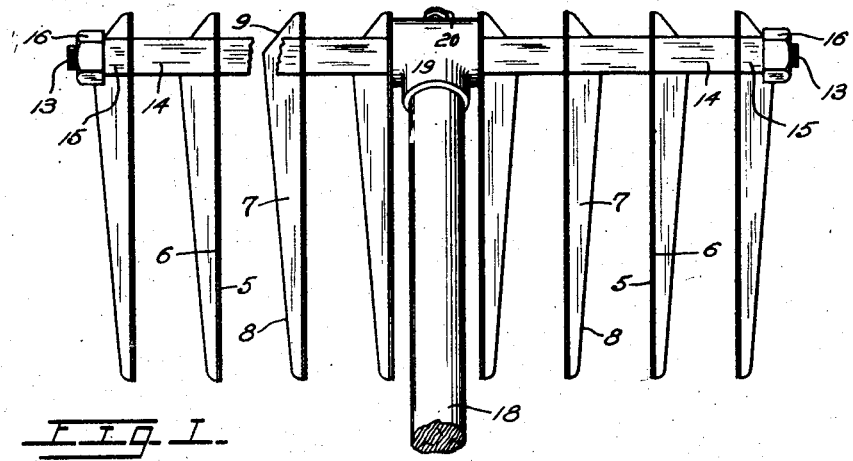
Figure 1 is a plan view of my improved implement.
Figure 2:
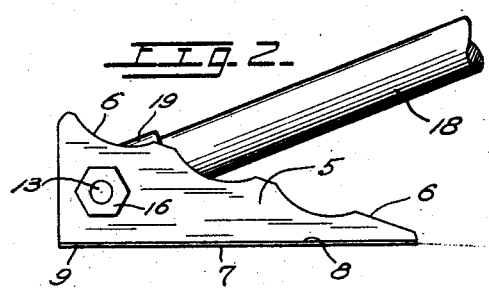
Figure 2 is an end elevation of the same.
Figures 3, 4:
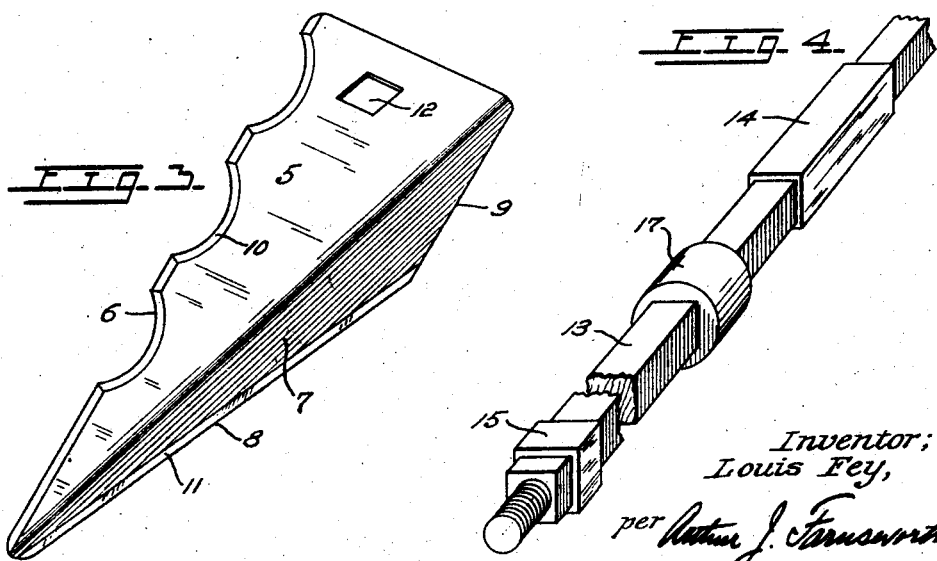
Figure 3 is an enlarged perspective view of one of the cutters of the tool by itself, and in a partly tipped-over position to show the bottom surface of the horizontal blade.
Figure 4 is en enlarged perspective view of a portion of the assembling bar, and the parts that cooperate therewith.

My device comprises a series of spaced geniculate cutters illustrated per se in Fig. 3. These have vertical blades 5 with upwardly sloping cutting edges 6, which preferably are serrated as shown; and horizontal blades 7, gradually increasing in width forwardly and provided with cutting edges 8. The horizontal blades may also be serrated if preferred. The front corners of these horizontal blades are cut away as at 9 from a point beneath the assembling bar, so as to more readily permit vegetation to pass through the device and minimize clogging under the bar.

Both edges of the cutters are sharpened from the outside as shown in Fig. 3, the cutting edge of the vertical blade being ground as shown at 10, and the cutting edge of the horizontal blade being ground as shown at 11. At the front of the vertical blades is a square hole 12 by means of which the cutters are assembled parallel to each other on the square assembling bar 13. Pieces of square tubing 14, slidable upon the bar, space the cutters uniformly, and shorter pieces of square tubing 15 overhang the respective ends of the bar and their outer ends serve as seats for the tightening nuts 16.

It is to be noted that the cutters are made as rights and lefts, and that there are an equal number of each on the respective sides of the tool center. The right hand cutters are spaced from the lefts by means of the cylindrical fitting 17, which has a square hole therethrough and is slidable upon the assembling bar.

The handle 18 of the tool extends out of a T-shaped fitting 19 which encloses fitting 17 and normally is free to rotate upon the latter. The T fitting is positioned by means of a set screw 20, and the handle of the tool may thus be set at any convenient angle relative to the horizontal blades.

The device is operated by pulling it toward the user with the horizontal blades of the cutters horizontal and sliding over the surface of the lawn. In this manner the horizontal stems of the Bermuda grass are picked up and severed by the serrated edges of the vertical blades. The vertical stems of Bermuda grass, and other weeds having stiff stems, are severed by the laterally sloping cutting edges of the horizontal blades of the cutters. The severed material will seldom accumulate in such a manner as to clog up the device, since it is free to pass between the vertical blades and under the assembling bar. If clogging should at any time occur, the material can be removed instantly by merely pushing the device forward away from the user. The convergence of both cutting edges toward a point at the rear results in freeing the clogged material.

Having thus fully described the construction and operation of my invention in a way that will be readily understood by those familiar with implements of this nature, I claim:—

1. A device of the character described comprising; a plurality of longitudinally geniculate cutter plates forming triangular horizontal and vertical blades with rearwardly convergent cutting edges; a transverse bar upon which said cutters are fixed in spaced alignment; and an angularly adjustable handle centrally engaging said bar.

2. A device of the character described comprising; a plurality of longitudinally geniculate cutter plates forming triangular horizontal and vertical blades with rearwardly convergent cutting edges; a transverse bar engaging said vertical blades and thereby fixing said cutters in spaced alignment; and an angularly adjustable handle centrally engaging said bar; one half of said horizontal blades being extended oppositely to the other half, and the cutting edges of the vertical blades being serrated.

LOUIS FEY.